United States Patent
Hurwood et al.

(10) Patent No.: US 6,772,137 B1
(45) Date of Patent: Aug. 3, 2004

(54) CENTRALIZED MAINTENANCE AND MANAGEMENT OF OBJECTS IN A REPORTING SYSTEM

(75) Inventors: William Hurwood, Washington, DC (US); Benjamin Z. Li, Great Falls, VA (US); Barry R. Lovalvo, Dallas, TX (US); Abhimanyu Warikoo, New York, NY (US)

(73) Assignee: MicroStrategy, Inc., McLean, VA (US)

( * ) Notice: Subject to any disclaimer, the term of this patent is extended or adjusted under 35 U.S.C. 154(b) by 412 days.

(21) Appl. No.: 09/884,446

(22) Filed: Jun. 20, 2001

(51) Int. Cl.[7] .......................... G06F 17/30; G06F 15/16
(52) U.S. Cl. ................................ 707/2; 707/1; 709/201
(58) Field of Search ............................... 707/1–3, 5–6, 707/9–10, 100, 102, 103 R–103 Z, 104.1, 200, 205; 345/661, 655; 709/201

(56) References Cited

U.S. PATENT DOCUMENTS

| | | |
|---|---|---|
| 4,688,195 A | 8/1987 | Thompson |
| 4,829,423 A | 5/1989 | Tennant |
| 5,197,005 A | 3/1993 | Shwartz |
| 5,276,870 A | 1/1994 | Shan |
| 5,317,739 A * | 5/1994 | Elko et al. .................. 709/216 |
| 5,418,943 A | 5/1995 | Borgida |
| 5,421,008 A | 5/1995 | Banning |
| 5,555,403 A | 9/1996 | Cambot |
| 5,584,024 A | 12/1996 | Shwartz |
| 5,664,182 A | 9/1997 | Nierenberg |
| 5,692,181 A | 11/1997 | Anand |
| 5,864,856 A | 1/1999 | Young |
| 5,914,878 A | 6/1999 | Yamamoto |
| 6,154,766 A | 11/2000 | Yost |
| 6,247,008 B1 | 6/2001 | Cambot |
| 6,279,033 B1 | 8/2001 | Selvarajan |
| 6,567,796 B1 * | 5/2003 | Yost et al. .................... 707/2 |
| 2002/0091702 A1 * | 7/2002 | Mullins ...................... 707/100 |
| 2002/0156797 A1 * | 10/2002 | Lee et al. ................... 707/200 |

OTHER PUBLICATIONS

Robert C. Stern, Bruce M. Anderson and Craig W. Thompson, A Menu–Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20–24, 1985.

Harry R. Tennant, Kenneth M. Ross, Richard M. Saenz, Craig W. THompson, and James R. Miller, Computer Science Laboratory, Central Research Laboratories, Texas Instruments Incorporated, Dallas, Texas, 21st Annual Meeting of the Association for Computational Linguistics, MIT, Jun., 1983, pp. 151–158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

(List continued on next page.)

Primary Examiner—Alford Kindred
(74) Attorney, Agent, or Firm—Hunton & Williams LLP

(57) ABSTRACT

An object management system in a reporting system. The system includes an object data repository and an object server in a reporting system. The object data repository may maintain a definition and other information for at least one object accessible by a plurality of user interfaces. The server may provide a single access point for enabling users at a plurality of user sites to access objects stored in the object data repository.

24 Claims, 5 Drawing Sheets

OTHER PUBLICATIONS

Craig W. Thompson, Kenneth M. Ross, Harry R. Tennant and Richard M. Saenz, Building Usable Menu–Based Natural Language Interfaces To Databases, Proceedings of the Ninth International Conference on Very Large Data Bases, Florence, Italy, Oct.31–Nov. 2, 1983, pp 43–55.

Craig W. Thompson, John Kolts, and Kenneth W. Ross, A Toolkit for Building "Menu–Based Natural Language" Interfaces, Texas Instruments Incorporated, P.O. Box 226015, MS 238, Dallas, Texas 75265, 1985.

Craig Warren Thompson, M.A., B.A., Using Menu–Based Natural Language Understanding to Avoid Problems Associated with Traditional Natural Language Interfaces to Databases, Dissertation Presented to the Faculty of the Graduate School of The University of Texas at Austin, May 1984.

Business Objects User's Guide Version 5.1.
Quick Start MicroStrategy Agent Version 6.0.
User Guide MicroStrategy Agent Version 6.0.
User Guide MicroStrategy Architect Version 6.0.
User Guide MicroStrategy Objects Version 6.0.
Excel Add–In MicroStrategy Objects Version 6.0.
User Guide MicroStrategy Intelligence Server Version 6.0.
User Guide MicroStrategy Administrator Version 6.0.
Administrator Guide MicroStrategy Administrator Version 6.5.
Getting Started with Business Objects Version 5.1.
Business Objects Deployment Guide.
Broadcast Agent 5.1.
Business Objects 5.1).
Web Intelligence 2.6.
Business Objects Designer's Guide Version 5.1.
Business Objects Error Message Guide Version 5.1.
Business Objects Generic ODBC Access Guide Version 5.1.
Business Objects Info View User's Guide.
Business Objects Installation and Upgrade Guide.
Business Objects MS Access Database Version 5.1.
Business Objects MS SQL Server Database Guide Version 5.1.
Business Objections Supervisor's Guide Version 5.1.

* cited by examiner

CENTRALIZED MAINTENANCE AND MANAGEMENT OF OBJECTS IN A REPORTING SYSTEM

FIELD OF THE INVENTION

The present invention relates to object maintenance and management in an on-line analytical processing system, business intelligence system or other reporting system.

BACKGROUND

Decision support systems have been developed to efficiently retrieve selected information from data warehouses. One type of decision support system is known as an on-line analytical processing system ("OLAP"). In general, OLAP systems analyze the data from a number of at different perspectives and support complex analyses against large input data sets. OLAP systems generate output upon execution of a report that includes a template to indicate the way to present the output and a filter to specify the conditions of data on which the report is to be processed.

Repositories of reports, templates, filters and other objects in OLAP, business intelligence or other reporting systems, may be numerous, extremely large and difficult to track. In addition to these issues, another layer of complexity may arise when a user tries to access a repository through different types of user interfaces. Some of these problems include object management specific to a particular user interface. For example, if an object is created using a specific user interface, viewing of the object is available only to other users using the specific user interface.

SUMMARY OF THE INVENTION

These and other drawbacks in existing systems are overcome through a technique for managing objects. In one embodiment, the technique is realized through an object management system in a reporting system. The system may include an object data repository and an object server in a reporting system. The object data repository may maintain a definition and other information for at least one object accessible by a plurality of user interfaces, including a web interface, desktop program, wireless device, telephone interfaces, "push" email interfaces and API-based interface into the reporting system. The server may provide a single access point for enabling users at a plurality of user sites to access objects stored in the object data repository.

According to another aspect of the invention, a method for managing object data in a reporting system is described. The method may include enabling creation of objects accessible by a plurality of user interfaces in a reporting system, storing created objects in an object data repository of a reporting system, and enabling users at a plurality of sites to access objects in the reporting system through a single access port.

Through use of an object manager that controls objects for various types of reporting system report and query interfaces, an object defined or created by one interface (e.g., a desktop) may be accessed through a wireless interface. Therefore, a user that creates a template or filter through the desktop, for example, may access that template or filter using the API, for example, through the object manager.

DETAILED DESCRIPTION OF PREFERRED EMBODIMENTS

Figure 2:
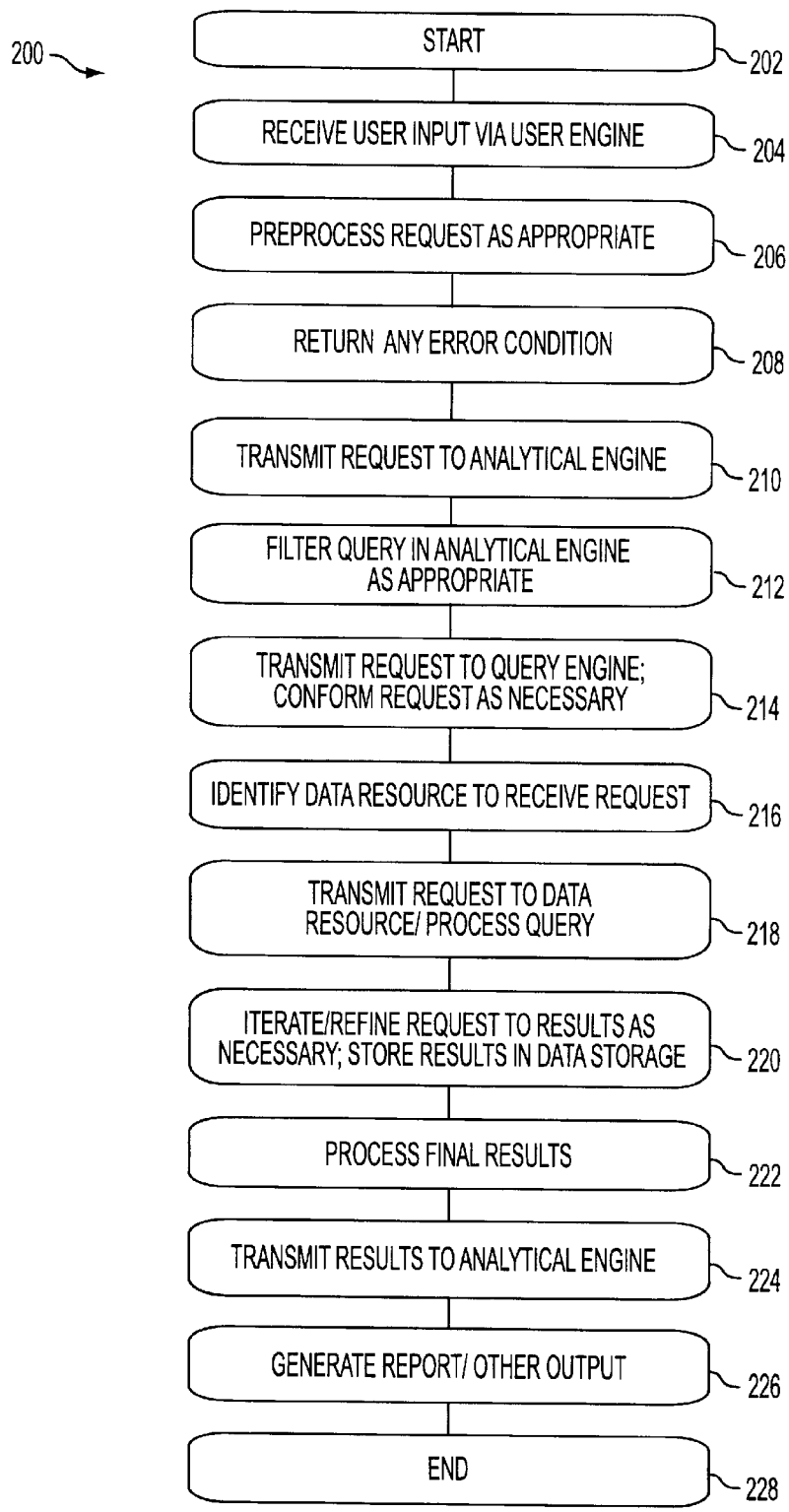
FIG. 2 is a flowchart illustrating steps performed by a process utilizing a query engine according to an embodiment of the invention.

While the present invention relates to a technique for managing objects in a reporting system, it is helpful to review an embodiment of a system in which this invention may be used, as shown in FIG. 2.

Figure 1:
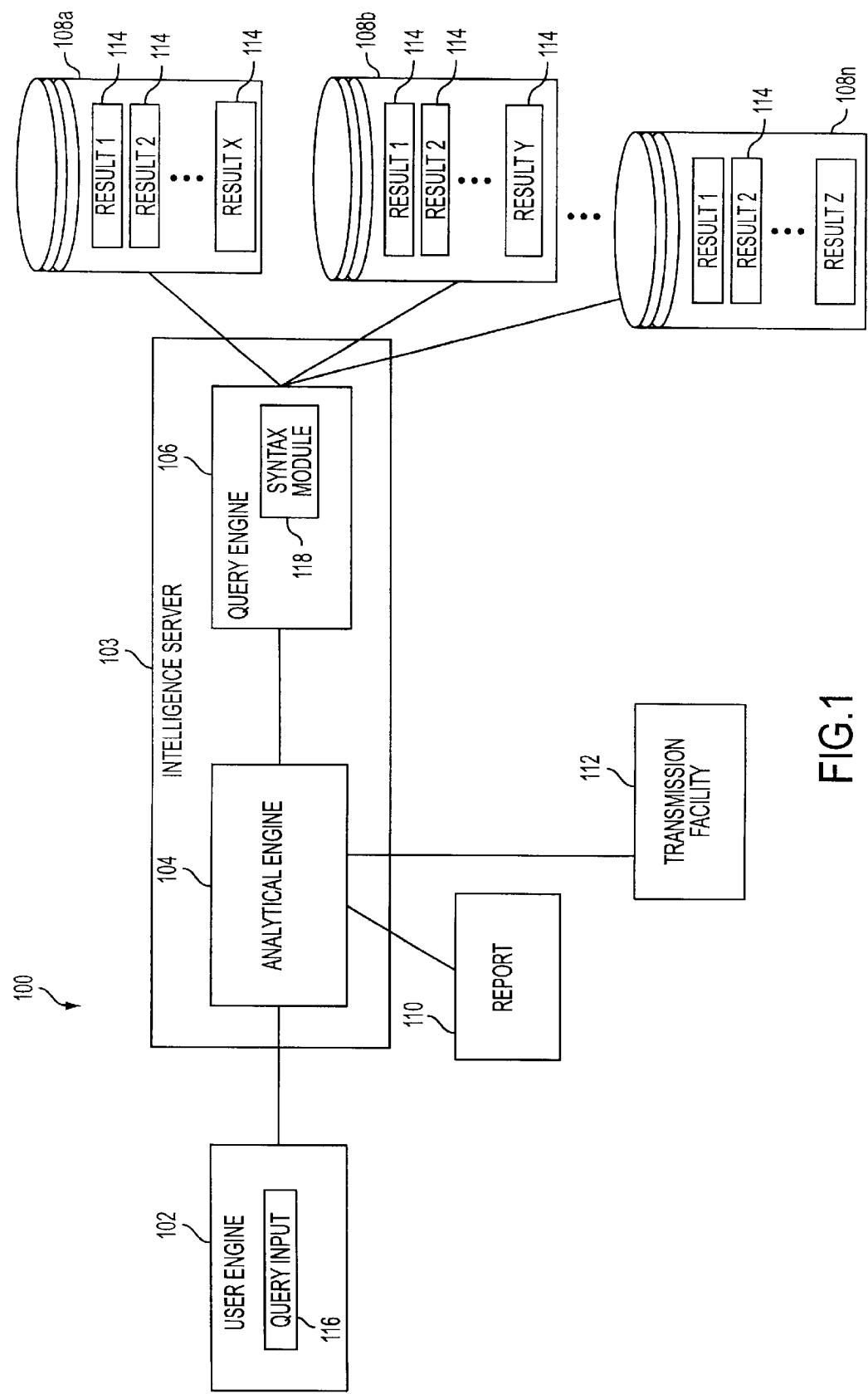
FIG. 1 is a block diagram illustrating an architecture for a system according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b ... 108n (where n is an arbitrary number). The data storage devices 108a, 108b ... 108n may include or interface to a relational database or another structured database stored on a hard disk, an optical disk, a solid state device or another similar storage media. When implemented as databases, the data storage devices 108a, 108b ... 108n may include or interface to, for example, an Oracle™ relational database such as sold commercially by Oracle Corporation, an Informix™ database, a Database 2

(DB2) database, a Sybase™ database, or another data storage device or query format, platform or resource such as an OLAP format, a Standard Query Language (SQL) format, a storage area network (SAN), or a Microsoft Access ™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows ™ NT™ operating system, a Windows™2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 Patent, an administrative level user may create a report as part of a service.

Subscribers/users may then receive access to reports through various types of of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 Patent. The platform of FIG. 1 may have many other uses, as described in detail with respect to the MicroStrategy 7 and 7.1 platform, the details of which will be appreciated by one of ordinary skill in the reporting and decision support system art.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 3:
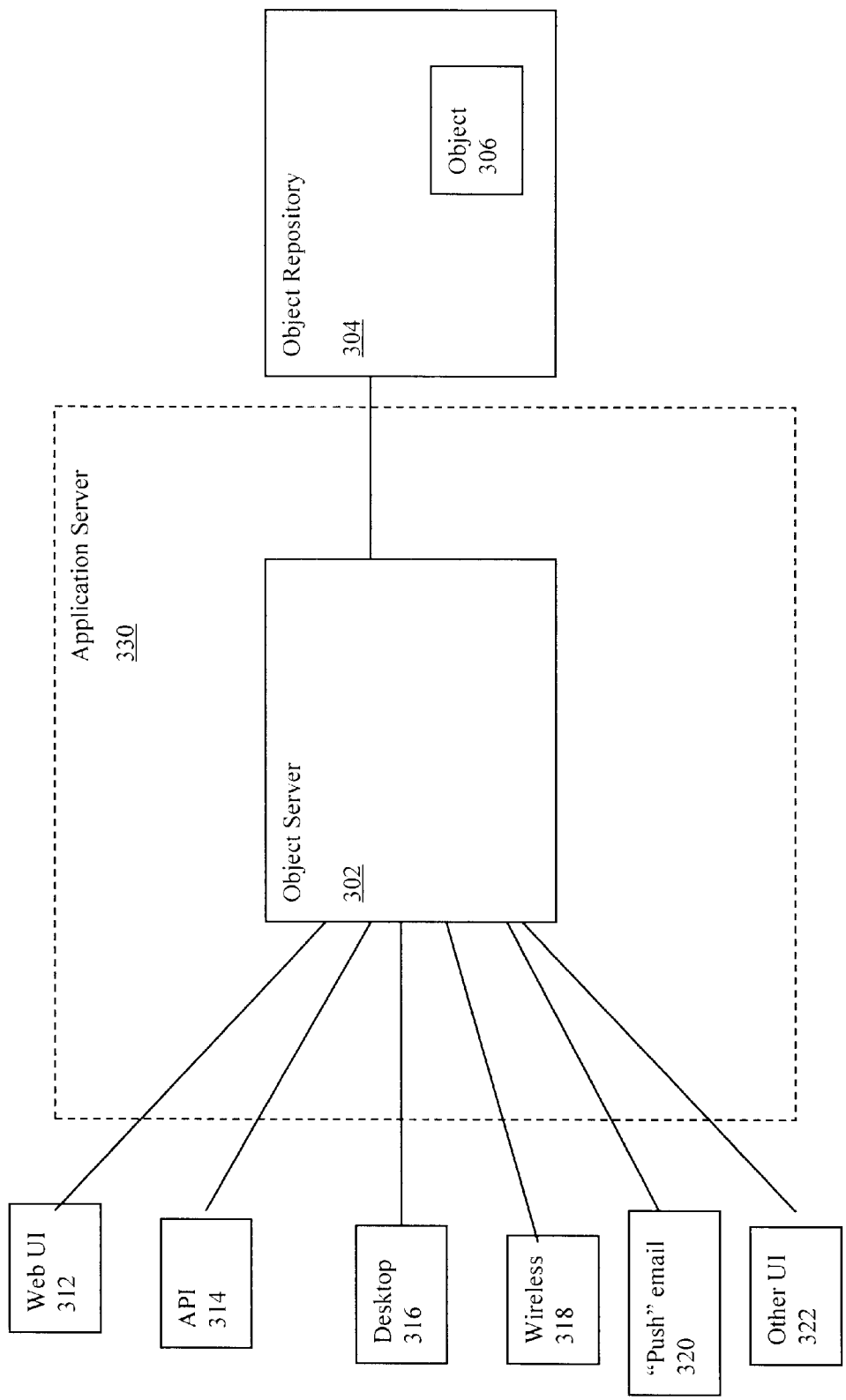
FIG. 3 is a block diagram illustrating one embodiment of an object management system.

In an embodiment of the invention illustrated in FIG. 3, the reporting system includes an object management system 300. The object management system 300 may include an application server 330 and an object repository 304 including at least one object 306. The application server 330 may support access to the object repository by a plurality of user interfaces 312–322. In one embodiment, the application server 330 may comprise an object server 302 for accessing the object repository 304.

The user interfaces that may access the user repository may include a web user interface 312, an application program interface ("API") 314, a desktop interface 316, a wireless interface 318, a "push" email client 320 and other interfaces 322. The wireless interface 318 may include interfaces for devices such as personal digital assistants ("PDAs"), cellular phones, and Wireless Application Protocol ("WAP") devices. The push email interface 320 refers to an interface where content may be pushed over a network, such as the Internet, to a targeted audience. For example, WAP may be used to push an email to a wireless device. Other interfaces 322 may include interfaces for telephones.

In one embodiment, the access by the plurality of the interfaces 312–322 may be supported through object design using component object model ("COM") API object design or using some other object model implemented in Java objects. The COM API may be a collection of COM interfaces that are used to expose functionality of a system, such as a reporting system, to the outside world. The COM interfaces may allow internal administrators of the reporting system developers to build reporting system applications. The COM interfaces may also allow third party developers to build reporting system applications.

The object server 302 may organize the data stored in the object repository 304. The object server 302 may create, manipulate and delete objects 306 in the object repository 304. The object server 302 may implement several COM interfaces including a component interface and a source interface. Objects 306 that are placed in the object repository 304 may use the component interface. The source interface may be used to expose functionality of the object server 302.

Preferably, all information in the object repository 304 may be organized by storing the information in metadata objects. In one embodiment, the object repository 304 may be a metadata repository. The object repository 304 may maintain definitions and other information regarding objects 306 in the reporting system and preferably maintains that information about all objects 306 in the reporting system.

The user interfaces 312–322 may use the objects created by the object server 302. In one embodiment, the objects 306 created and stored by the object server 302 may be integrated objects allowing access by any of the user interfaces 312–322. For example, a report defined on the desktop may be viewable via another interface, such as a web interface.

Figure 4:
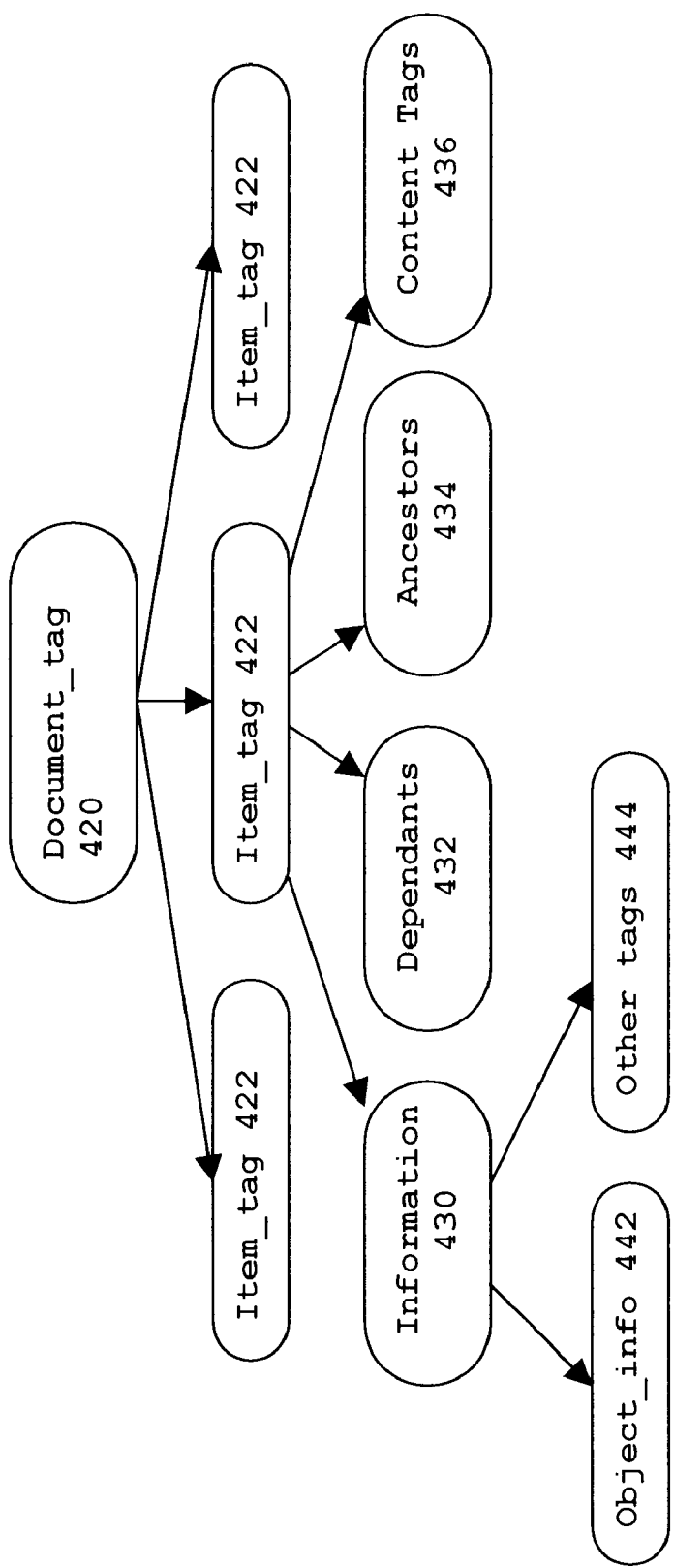
FIG. 4 is a block diagram illustrating one embodiment of the object repository of FIG. 3.

The structure of one embodiment of object data 306 stored in the object repository 304 is illustrated in FIG. 4. Object repository 302 may include documents, represented by document_tag 420. Each document_tag may be include item_tags 422. Each item_tag 422 may have a structure including common tags 430–436. The common tags may include information tag 430, ancestors tag 432, dependents tag 434 and content tags 436.

In one embodiment, reporting system documents may be embedded in each other. In one embodiment, the reporting system documents may be XML documents. Although many different types of documents may be used with the object management system of the present invention, objects 306 stored in the object repository 304 will be described with reference to XML documents for illustration purposes.

The embedding of the documents may be accomplished by using two different tags. The first tag, document_tag 420, may represent the highest level node in an reporting system document. Every XML document may contain exactly one document_tag 420. The document_tag 420 may be used to mark a piece of XML as following the reporting system XML specifications.

Within an XML document, there may be many different items. For example a document could contain a report instance item, a DSS Object item, an element hierarchy item, etc. In one embodiment, a single XML document that contains several of these items may be desired. For example, a complete report instance document may contain several DSS Objects.

In order to distinguish clearly between different items in a common XML document, a tag called item_tag 422 may be used. Every XML document may contain at least one item_tag 422. If a single XML document that contains several XML items embedded in each other was constructed, an application may be able to separate the XML document into separate items by looking for the item_tag tags 422.

The item_tag tags 422 in a document may be independent of each other so that a subtree rooted in a particular item_tag tag 422 may not need any information from outside the tree to be processed. Thus, if a new XML document were created by creating a new document_tag 420 node and then inserting an item_tag 422 node and its subtree from another document, a valid document would be created.

The common tags 430–436 allow tools looking at an item to easily determine information about the item. In particular, DSS Objects that are referenced by the item may be standardized using the common tags 430–436.

Not all of the common tags, ancestors 434, dependents 432, and information 430, need exist below any particular item_tag 422. However, if those tags do exist, they may be present in a predefined location.

The information tag 430 may hold information about objects 306, including DSS Objects, that appear in the item_tag 422. The information tag 430 may be used to make it easy to find out which objects appear in the document 420. When an object appears several times in the item 422, the information tag 430 may normalize the supplemental information. A reference identification ("refid") may be used to cross reference between objects under the information tag 430, and the same objects in the item's content tags 436.

The dependents tag 432 may hold dependency relations between the objects in the item_tags 422 of a document 420. The ancestors tag 434 may hold a list of ancestors. If the item 422 needs a list of ancestors to establish its position in some hierarchy, then the list may be placed under an ancestors tag 434. The ancestors tag 434 may allow a component to render the path to the item, without giving the item itself. The content tags 436 may be specific to the nature of the item 422. Depending on the item 422 there may be many more tags.

The information tag 430 may include further nodes including object_info 442 and other tags 444. Each of the nodes 442, 444 may represent a data structure, such as a DSS object, that appears elsewhere in the item 422. Each of the nodes 442, 444 may be identified by a refid attribute. In one embodiment, the refid may be an integer. In order to enable efficient manipulation of the document, the refid values may be unique in the entire document 420. In one embodiment, each item_tag 422 may include the attributes of min_refid and min_refid to specify the range of the refids for the item_tag 422. This range allows maintenance of the uniqueness of the refids when two or more items 422 are merged into the same document 420.

In one embodiment, all DSS objects in an item 422 may appear below the information tag 430 so that a list of the DSS objects may be easily obtained. Each DSS object may appear as an object_info tag 442. The object_info tag 442 may include subnodes (not shown) for DSS properties. The object_info tag 442 may also include subnodes for interface attributes, if they are present. If the document 420 desires more information about the DSS object than is contained in the object_info tag 442, then another item_tag 422 may be added either under the object_info tag 442 or in the main part of the surrounding item 422.

In one embodiment, every relationship listed under the dependents tag 432 may relate items located under the information section 430. The dependents tag may have only one attribute, the refid, which may contain a small unique identifier. The identifier may be associated with an item under the information tag 430 so that there may not be an dependents tag 432 unless there is an information tag 430.

The ancestors tag 434 may be used to list items which have a parent-child relationship. Two examples of objects with a parent-child relationship are folders and elements. Each ancestor may be listed, along with its refid attribute and a collection of item specific tags.

The attributes included in the object_info tag 442 may include a text definition of the object, creation time, description, DSS identification, whether the object is hidden, local id number assigned to the object, time when the item was last modified, name, state, subtype, type, version and abbreviation for the name of the object. Each object 306 may have extended properties fields in the object repository 304. The definition of the object 306 may grow and be customized to meet any requirements, needs or desires. The objects 306 may have other structures within the repository 304. For example, in one embodiment the text description of the object may reside on a separate node from the information tag 430.

In one embodiment, the state may give transient information about the object such as, for example, whether or not the object has been modified since it was last stored in metadata. The subtype may include detailed information about the type of the object such as, for example, whether an attribute is a normal attribute or a transformation attribute. The type may be used to assign a general type to an object, such as, for example, whether the object is a filter or a metric or another type. The object_info tag 442 may also include parent tags including metric, attribute, dimension, consolidation, consolidation_element, custom_group and form.

The object 306 described by the object_info tag 442 may include many types of objects. In one embodiment, the object may be one of a filter, an attribute, a dimension, a template, a report, a document, a metric, a folder, a schedule trigger or any object applicable to a reporting system.

A filter object may be used to specify a restriction on a data set. A representation of filters may be supported through a web interface so that the web server is able to limit the set of elements returned on an element borrow request.

An attribute may be used to specify a natural grouping of data in the data warehouse. For example, "city," "year" and "transaction" may be possible attributes for data in the data warehouse. A dimension may be used to specify relationships between attributes in the warehouse. The dimension object may include a plurality of techniques of specifying relationships between attributes. In one embodiment, in addition to a list of attributes, a dimension may specify parent-child relationships between the attributes in the list.

A template may be used to specify the content and layout of a report. If a web server is permitted to retain a report instance in XML, then the XML may hold all of the report instance information in a template. For example, the template may hold information regarding attributes, dimension, metrics, custom groups and consolidation units.

A schedule trigger may be used to trigger a set of scheduled requests. The trigger may be event based or a time point series based. If the trigger is event based, the trigger may be triggered when the event occurs. If the trigger is time point series based, the trigger may be fired at a series of time points.

Figure 5:
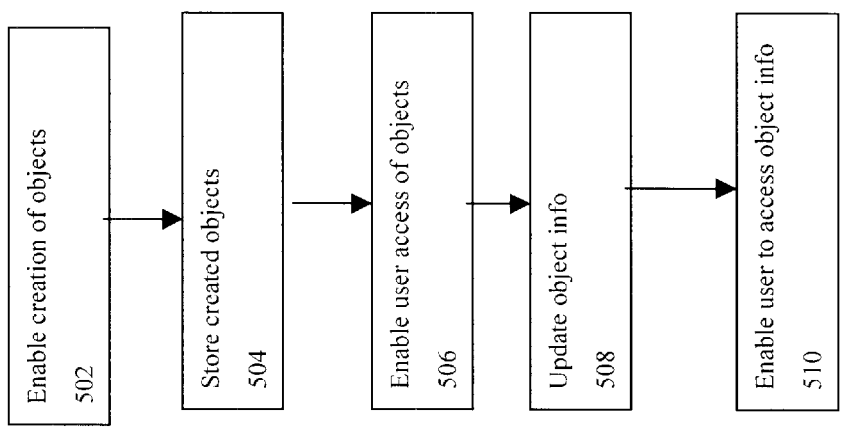
FIG. 5 is a flow diagram illustrating one embodiment of a method for managing objects in a reporting system.

A method of managing the objects 306 in the reporting system is described with reference to FIG. 5. The steps of the method described with reference to FIG. 5 are described in an order for illustration purposes only. The steps 502–510 may be performed in any order, depending on design and/or operation. At step 502, the reporting system enables creation of objects 306. The objects 306 may be integrated objects allowing access by a plurality of user interfaces 312–322.

At step 504, the objects 306 may be stored in an object repository 304. By storing the integrated objects 306 in the object repository 304, centralized management of the objects 306 may be attained. Since the objects 306 are integrated objects, the objects 306 do not need to be stored on separate servers for user access. For example, if a user is accessing an object 306 through a desktop interface and another user is accessing the same object 306 through a web interface, separate object servers are not needed since the object server 302 enables access of the same object 306 through different user interfaces.

In one embodiment, the object server may reside in an application server. Thus, centralized access may be achieved through the application server hosting the object server 302 that any user may access using any user interface 312–322. The application server may manage all database connections such as the database connection to object repository 304.

Since multiple users may be accessing and trying to modify object 306 at the same time, accessing object 306 through a centralized object server 302 allows object integrity to be maintained. For example, if two users do not go through the same object server 302, whoever makes the last modification to object 306 may update a outdated or obsolete object. Thus, the last modification may not make sense when the two object representations are merged. By using one centralized object server 302 which can marshal object changes, this situation may be mitigated. The centralized object server 302 may automatically resolve the conflict situation, make each user aware of changes made by the other, or enable a user to lock an object to prevent simultaneous modification by others.

At step 506, the object server 302 enables users to access the objects 306 in the object repository 304. The users may access the objects 306 through user interfaces 312–322. Since all of the users access the objects 306 through object server 302, only one accesspointis used for object access, allowing centralized maintenance of the object information.

The method may further include updating the object data in the object repository 304 by updating the information stored under object_info 442 or any other part of the document record 420 at step 508. The information updated may include definition and other information regarding objects in the reporting system. Updating the information stored may include updating, deleting, modifying, and/or duplicating the information stored under object_info 442 or any other part of the document record 420, including the entire document record 420. The method may also include allowing users to access the information stored under object info 442 to view information regarding the object, such as definitions, and enabling users to access state information related to the reporting system, at step 510. The state information may include information about the users connected, information about the projects loaded, the database connections currently being made, caches being maintained, jobs the reporting system is running and the status of projects. For example, the object information may tell the user that a certain project is paused or being loaded.

Other embodiments and uses of the invention will be apparent to those skilled in the art from consideration of the specification and practice of the invention disclosed herein. The specification and examples should be considered exemplary only.

What is claimed is:

1. An object management system in a reporting system comprising:
    an object data repository maintaining a definition and other information for at least one object accessible by a plurality of user interfaces; and
    a server in a reporting system providing a single access point for enabling users at a plurality of user sites to access objects stored in the object data repository and allowing the objects to be modified by the users while maintaining object integrity of the accessed objects.

2. The object management system of claim 1 wherein the server provides a single access point for users using a plurality of user interfaces.

3. The object management system of claim 2 wherein the user interfaces comprise at least one of a web user interface, an application program interface, a desktop interface, a "push" email interface, and an interface provided by a wireless device.

4. The object management system of claim 1 wherein the object data in the object repository is arranged according to items to which the object belongs and documents to which the items belong.

5. The object management system of claim 1 wherein the server maintains and provides state information comprising at least one of information about users connected, information about projects loaded, current database connections, caches being maintained, jobs the reporting system is running, and status of the projects wherein each of the projects comprise at least one object.

6. The object management system of claim 1 wherein the at least one object comprises one of a filter, an attribute, a dimension, a template, a report, a document, a metric, a folder, a schedule trigger and any object applicable to a reporting system.

7. The object management system of claim 1 wherein the server enables creation of an integrated-access object stored in the reporting system through a first user interface and access to the integrated-access object through a second user interface wherein the first user interface and the second user interface comprise different types of user interfaces.

8. The object management system of claim 1 wherein the server performs at least one of updating, deleting, modifying, and duplicating the object information for the object stored in the object repository.

9. The object management system of claim 1 wherein the server enables a modification made to a particular object in the object repository by a first user using a first user interface to be reflected in the version of the particular object accessed by a second user using a second user interface.

10. The object management system of claim 9 wherein the first user interface and the second user interface comprise different types of user interfaces.

11. The object management system of claim 1 wherein the server maintains object integrity by performing at least one of automatically resolving a conflict situation between users, making each user aware of changes made by another, and enabling a user to lock an object to prevent simultaneous modification by other users.

12. A method for managing object data in a reporting system comprising:
    enabling creation of objects accessible by a plurality of user interfaces in a reporting system;
    storing created objects in an object data repository of a reporting system; and
    enabling users at a plurality of sites to access objects in the reporting system through a single access point and allowing the objects to be modified by the users while maintaining object integrity of the accessed objects.

13. The method of claim 12 further comprising enabling users to access at least one of definitions of all objects in the reporting system and state information associated with projects in the reporting system through the single access point, wherein each of the projects comprise at least one object.

14. The method of claim 12 further comprising maintaining and providing state information wherein the state information comprises at least one of information about users connected, information about projects loaded, current database connections, caches being maintained, jobs the reporting system is running, and status of the projects wherein the projects comprise objects.

15. The method of claim 12 further comprising enabling creation of an integrated-access object stored in the reporting system through a first user interface and enabling access to the integrated-access object through a second user interface wherein the first user interface and the second user interface comprise different types of user interfaces.

16. The method of claim 12 wherein the plurality of user interfaces comprise at least one of a web user interface, an application program interface, a desktop interface, a "push" email client and an interface provided by a wireless device.

17. The method of claim 12 wherein the objects comprise one of a filter, an attribute, a dimension, a template, a report, a document, a metric, a folder, a schedule trigger and any object applicable to a reporting system.

18. The method of claim 12 further comprising at least one of updating, deleting, and copying information relating to the object in the object repository.

19. The method of claim 12 further comprising enabling a modification made to a particular object in the object repository by a first user using a first user interface to be reflected in the version of the particular object accessed by a second user using a second user interface.

20. The method of claim 19 wherein the first user interface and the second user interface comprise different types of user interfaces.

21. The method of claim 12 further comprising maintaining object integrity by performing at least one of one of automatically resolving a conflict situation between users, making each user aware of changes made by another, and enabling a user to lock an object to prevent simultaneous modification by other users.

22. A processor usable medium having processor readable program code embodied therein for managing objects in a reporting system, the computer readable code comprising:

processor readable code enabling creation of objects accessible by a plurality of user interfaces in a reporting system;

processor readable code storing created objects in an object data repository of a reporting system; and processor readable code enabling users at a plurality of sites to access objects in the reporting system through a single access point and allowing the obiects to be modified by the users while maintaining object integrity of the accessed objects.

23. The processor usable medium of claim 22, the computer readable code further comprising:

processor readable code enabling users to access at least one of definitions of all objects in the reporting system and state information associated with projects in the reporting system through the single access point, wherein the each of the projects comprise at least one object.

24. The processor usable medium of claim 22, the computer readable code further comprising:

processor readable code enabling a modification made to a particular object in the object repository by a first user using a first user interface to be reflected in the version of the particular object accessed by a second user using a second user interface wherein the first user interface and the second user interface comprise different types of user interfaces.

\* \* \* \* \*